United States Patent [19]

Fabris

[11] Patent Number: 4,626,403
[45] Date of Patent: Dec. 2, 1986

[54] RECOVERY SHROUD FOR DAMAGED NUCLEAR FUEL ELEMENTS

[75] Inventor: Mirko Fabris, Nivelles, Belgium

[73] Assignee: Ateliers de Constructions Electriques de Charleroi (ACEC), Brussels, Belgium

[21] Appl. No.: 452,124

[22] Filed: Dec. 22, 1982

[30] Foreign Application Priority Data

Dec. 29, 1981 [EP] European Pat. Off. ........ 81201402.5

[51] Int. Cl.⁴ ............................................. G21C 19/00
[52] U.S. Cl. .................................................... 376/272
[58] Field of Search ............... 376/272, 362, 364, 260, 376/261, 262, 264, 268–271; 294/86 A; 248/544

[56] References Cited

U.S. PATENT DOCUMENTS

| 2,524,430 | 10/1950 | Dixon | 220/55 |
| 3,386,273 | 6/1968 | Green | 70/168 |
| 4,268,357 | 5/1981 | Formanek et al. | 376/364 |
| 4,298,434 | 11/1981 | Anthony et al. | 376/364 |
| 4,309,251 | 1/1982 | Anthony et al. | 376/364 X |
| 4,400,344 | 8/1983 | Wachter et al. | 376/272 |
| 4,435,358 | 3/1984 | Krieger | 376/272 |
| 4,446,098 | 5/1984 | Pomaibo et al. | 376/272 X |
| 4,474,398 | 10/1984 | Tolino et al. | 376/362 X |

FOREIGN PATENT DOCUMENTS

| 1057526 | 5/1959 | Fed. Rep. of Germany . |
| 1546782 | 10/1968 | France . |
| 2462765 | 2/1981 | France . |
| 2462766 | 3/1981 | France | 376/272 |

Primary Examiner—Deborah L. Kyle
Assistant Examiner—Dan Wasil
Attorney, Agent, or Firm—Schwartz, Jeffery, Schwaab, Mack, Blumenthal & Evans

[57] ABSTRACT

The shroud is designed to prevent components of a damaged nuclear fuel element from dropping into a pool. The shroud consists of a body 1 surrounding the nuclear element over the major part of its height, and a base 2 equipped with a device to attach it to the feed 13 of the fuel element. The attaching device is actuated by the rotation of a control shaft 17 capable of being inserted in the center of a hub 9 equipped with two arms 10, which carry at their ends gripper fingers 11, maintained in their position of engagement in the feet 13 by springs 20.

8 Claims, 6 Drawing Figures

RECOVERY SHROUD FOR DAMAGED NUCLEAR FUEL ELEMENTS

BACKGROUND OF THE INVENTION

1. Field of the Invention

This invention relates to shrouds for the recovery of fuel elements in a nuclear power plant.

2. Discussion of Related Art

In a nuclear power plant the life of a fuel element is limited to a few years only. This life expectancy is further shortened if a defect of any kind is found to affect a single component of the fuel element. Each element comprises a large number of components in the form of rods and damage to one of these rods leads to the removal of the entire assembly from service. The rods consist of pellets contained in a tight metal can. These rods are placed in bundles in a structure with a square cross section which structure consists of two vertically spaced plates joined to each other by means of a series of mounting tubes. Grids, which are perforated by holes, are threaded on the mounting tubes in a regularly spaced manner. These grids serve to hold the rods in position. The upper plate serves as the raising system for the fuel elements. The lower plate is equipped with four feet placed at the corners and acts as the bearing surface of the fuel element on the bottom of the pool. When it is found that one rod in a fuel element is damaged, the defective fuel element is withdrawn to remove it from service.

However, over a certain period of time, for economic reasons, a method has been developed for the recovery of rods remaining intact in defective fuel elements. This method requires a series of manipulations involving a high degree of risk that the broken or damaged rods will become detached from the fuel element and will drop into the pool, thereby contaminating the latter.

To eliminate these disadvantages, the defective fuel element is placed in a shroud which retains all of the debris. To utilize the raising system initially provided for the fuel element, the shroud must be attached to the structure of the fuel element itself.

SUMMARY OF THE INVENTION

The present invention concerns a recovery shroud equipped with a device attaching it to the structure of the fuel element and to its control device.

One object of the present invention is to provide a recovery shroud which can be easily attached to or detached from a fuel element of a nuclear power plant.

A further object of the present invention is to provide a recovery shroud which surrounds at least a portion of a fuel element.

Another object of the present invention is to provide a recovery shroud which can be actuated relatively easily from a remote position.

A still further object of the present invention is to provide a recovery shroud which is relatively uncomplicated in design and yet meets the high standards required of structures used in nuclear power plants.

In accordance with the above and other objects, the shroud of the present invention comprises a body surrounding at least a portion of a fuel element and having a base for receiving and supporting at least one foot of the fuel element. The shroud also includes retaining means movable between a retaining position holding the foot on the base, and a release position wherein the foot is free to move from said base.

The recovery shroud is used in combination with an actuation means for moving the retaining means between the retaining position and the release position.

The recovery shroud retaining means comprises at least one gripper finger mounted for movement toward and away from the one foot and the actuation means comprises a shaft removably connected to a rotatable element connected to move a gripper finger and means for rotating the shaft.

The actuation means further includes a frame having an upper portion removably supporting the base, and having a support structure rotatably supporting the shaft in a substantially vertical orientation.

The retaining means comprises a rotatable element mounted to the base and having a substantially vertical opening, and the actuation means comprises a substantially vertical shaft having an upper end removably received in the vertical opening.

The actuation means comprises a lower portion having a rotatable element receiving the lower end of the vertical shaft, and means for rotating the lower portion rotatable element.

The means for rotating the lower portion rotatable element comprises a cable connected to the lower portion rotatable element and a grasping means connected to one end of the cable.

The base includes at least one drainage hole.

The retaining means further comprises a spring connected to bias the finger toward the foot.

BRIEF DESCRIPTION OF THE DRAWINGS

The present invention will become more readily apparent as it becomes more clearly understood from the detailed description below, reference being had to the accompanying drawings in which like reference numerals represent like parts throughout, and in which.

DETAILED DESCRIPTION OF THE PREFERRED EMBODIMENT

Figure 1:
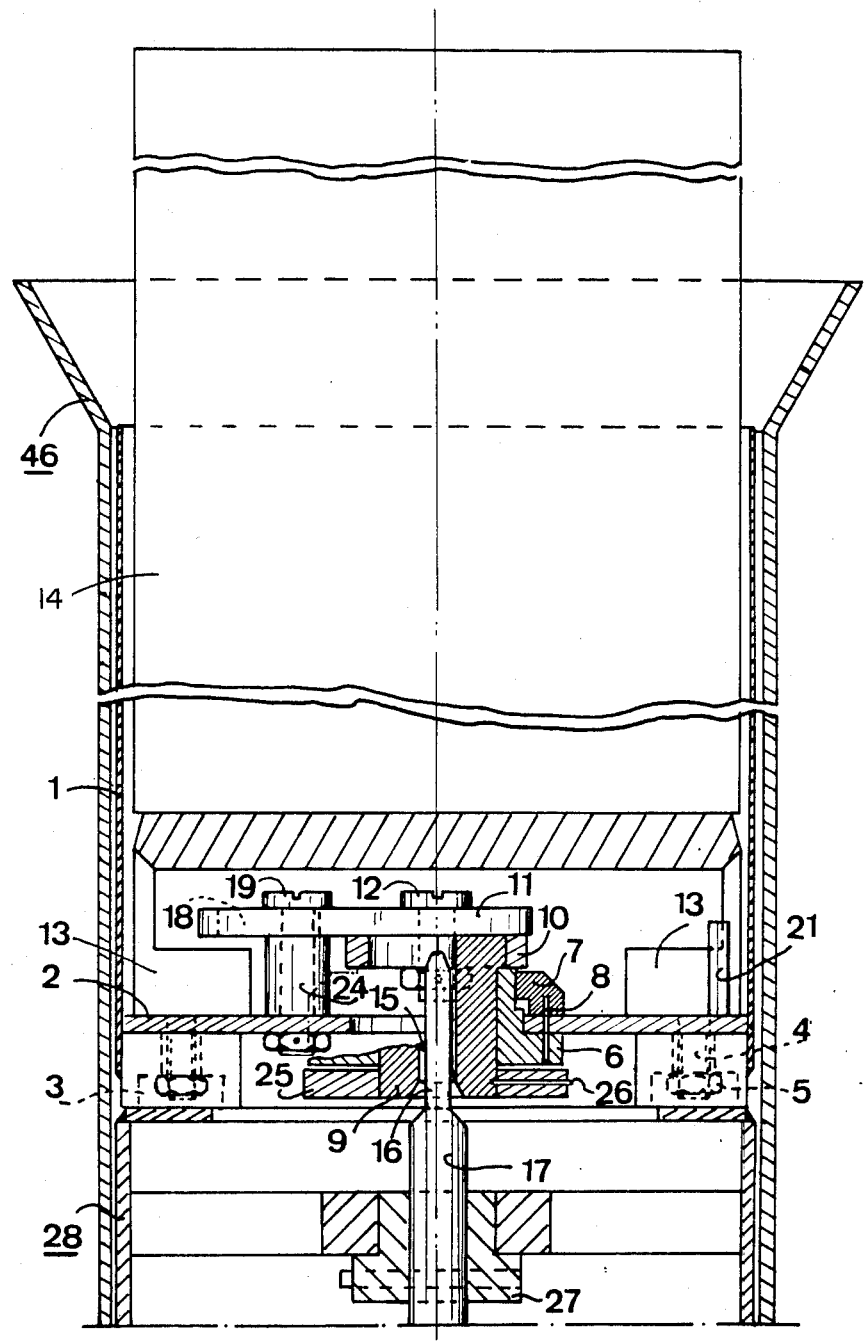
FIG. 1 is an elevational cross-sectional view of the recovery shroud, the retaining device and the upper portion of the control device of the present invention.

Referring to FIG. 1, the recovery shroud is shown to comprise a body 1 with a square cross section and a base 2 provided with four feet 3 secured to the base 2 by means of gudgeons 4 and nuts 5. The base 2 is equipped at its center with a bearing ring 6 and a bushing 7 which are attached to the base 2 by a series of pins 8. Bearing 6 and bushing 7 permit the rotational displacement of a hub 9 which is provided with two diametrically opposed arms 10.

Figure 2:
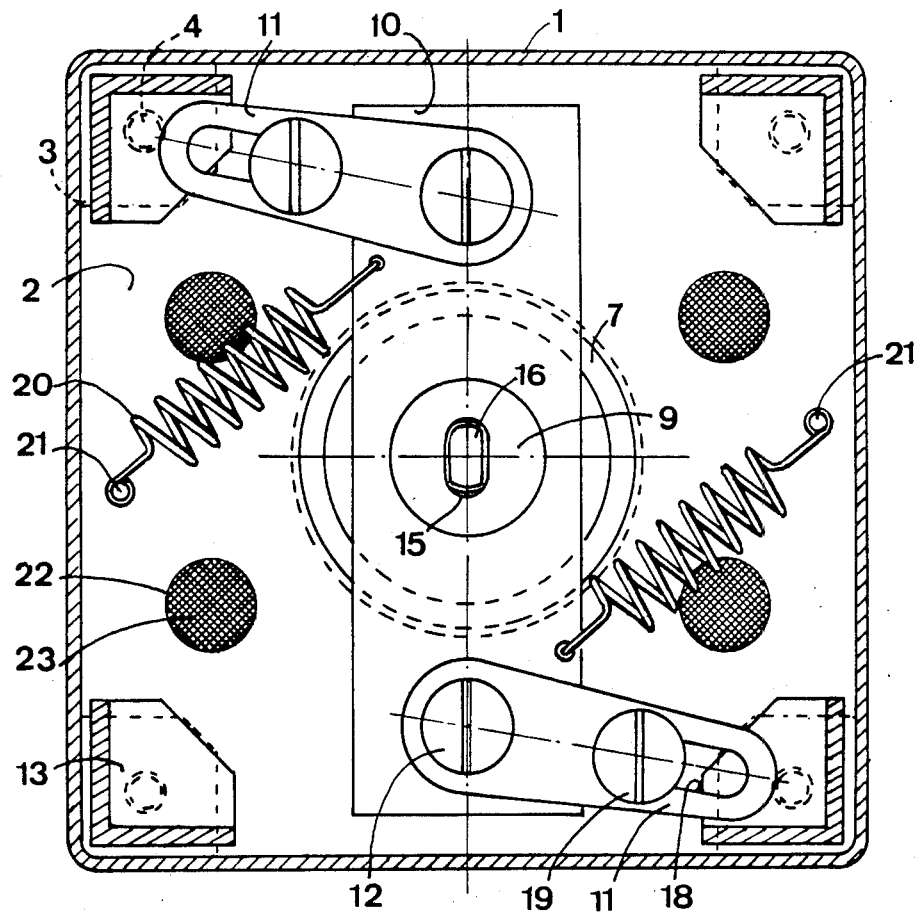
FIG. 2 is a top plan view of the recovery shroud.

As shown in elevation in FIG. 1 and in plan view in FIG. 2, the arms 10 serve as the supports for two gripping fingers 11, each of which is articulated by means of an axle 12 to the end of an arm 10. The gripping fingers 11 engage two of the four feet 13 of the fuel element 14.

The hub 9 has an oblong hole 15 at its center to receive an end 16 of a control shaft 17 which is congruent with hole 15. The end 16 is of a configuration capable of transmitting a torque force through hub 9 to arms 10. Each gripping finger 11 is provided with a stud hole 18 which, in cooperation with a guide pin 19 secured to the base 2, guides a gripping finger 11. Each gripping finger 11 engages or disengages one of the feet 13 in accordance with the direction of rotation of the control shaft 17. Gripping fingers 11 engage the two diametrically opposed feet 13 of the assembly of four feet 13, supporting the fuel element 14, the other two feet being free.

Two springs 20 are provided. Each spring 20 is attached on one hand to a pin 21 secured to the base 2 and on the other to an arm 10. Springs 20 work in tension to rotate arms 10 in the same direction and maintain the gripping fingers 11 in their respective positions engaged in the feet 13.

The base 2 is provided with drain holes 22 to permit the flow of water through the shroud into the pool below. Each hole is provided with a grating 23 to retain debris in the recovery shroud that could otherwise contaminate the pool.

FIG. 1 further shows the guide pins 19 fastened to the base 2 of the shroud to be provided with a ring shaped bushing 24. A bushing 24 is placed around each pin 19 to support a gripping finger 11.

The hub 9 is equipped with a threaded end in order to secure to it a washer screw 25 maintained in place by a pin 26. A bearing 27 is integral with a frame 28 and serves to guide the control shaft 17.

Figure 3A:
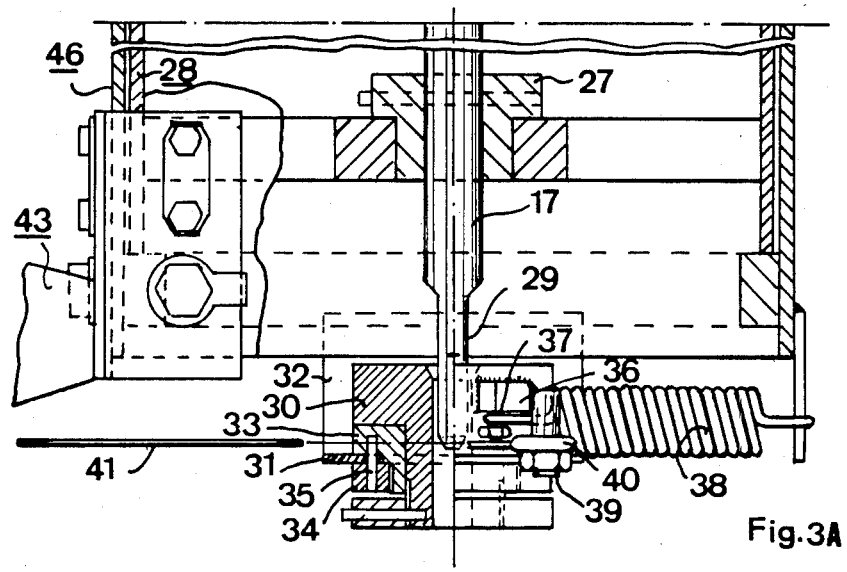
FIG. 3A is an elevational sectional view of the lower portion of the control device of the present invention.

FIG. 3A is a view in cross section showing the control device. Another bearing 27, integral with the frame 28, appears in this figure; it guides the other end of the control shaft 17. The control shaft 17 has a second end 29 shaped to cooperate with a hole made in the center of a control ring 30 to transmit a torque force. The end 29 of the control shaft 17 is supported by a counter bearing 31 secured to a center piece 32 that is integral with the frame 28. The control ring 30 pivots in a bearing bushing 33 supported by the counter bearing 31 and joined to the latter by means of a washer screw 34. A pin 35, placed across the washer screw 34, the counter bearing 31 and the bearing bushring 33 assures the retention of the screw 34 on the external threading of the bearing bushing 33.

Figure 4A:
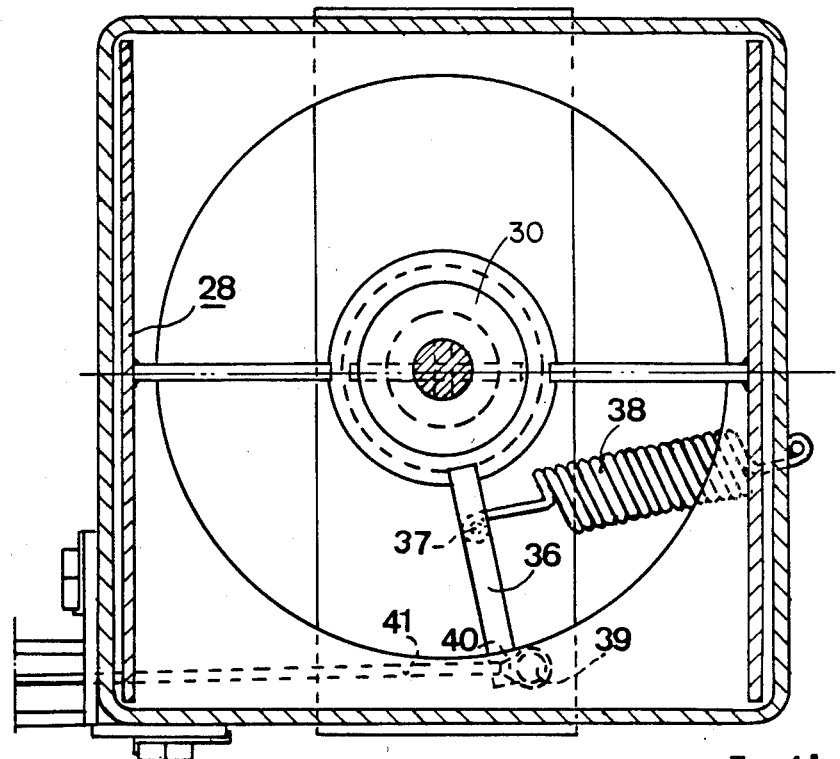
FIG. 4A is a top plan section view showing the lower portion of the control device for the present invention.

FIG. 4A shows the control device in plan view. The control ring 30 is provided with a manipulating arm 36 carrying a first gudgeon 37 serving as the point of attachment for a spring 38 and a second gudgeon 39 located at the end of the manipulating arm 36 and serving as the point of attachment of a terminal eye 40 of a cable 41. The spring 38, attached on the one hand to the gudgeon 37 of the manipulating arm 36 and on the other, to the frame 28 works in tension to insure the return of the manipulating arm 36 into its normal position corresponding in FIG. 2 to the engagement of the gripping fingers 11 in the feet 13 of the fuel element 14. The screws threaded onto the gudgeons 37 and 39 are tightened and maintained in place by pins to secure, respectively, the spring 38 and the eye 40 of the cable 41 with the degree of safety required for nuclear material.

In a general manner, in the fastening and control devices and in the superstructures necessary for the use of the recovery shroud, each screw, nut or bolt is equipped against loosening by cotter pins, pins or pliable heads to attain the level of safety required for nuclear materials.

Figure 3B:
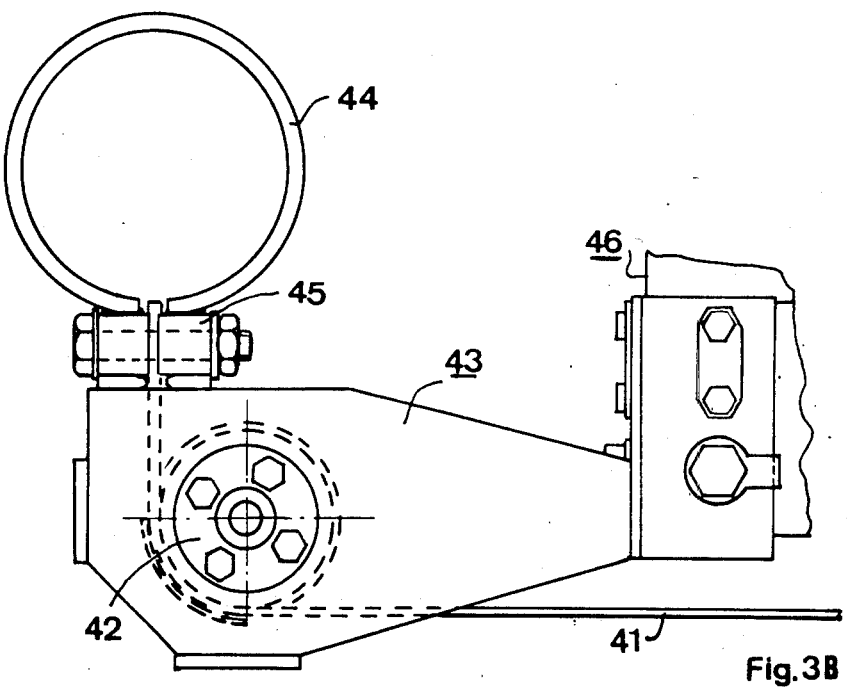
FIG. 3B is an elevational part fragmentary view showing the actuation mechanism for the recovery shroud of the present invention.
Figure 4B:
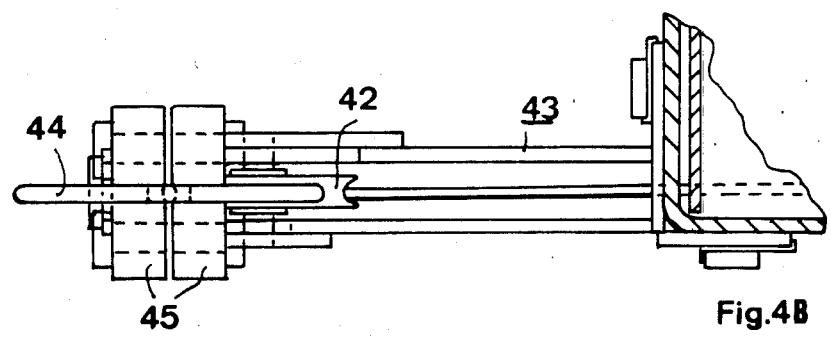
FIG. 4B is a top plan, part fragmentary view showing the actuation mechanism for the recovery shroud of the present invention.

As shown in FIGS. 3B and 4B, a pulley 42 placed on a support 43 serves as a counter shaft for the cable 41. The other end of cable 41 is fastened by clamping to a lifting ring 44. The lifting ring 44 is open at its end and attached to two jaws 45 which are welded to each end of the lifting ring 44. The jaws 45 are closed under the action of two bolts, to clamp the end of the cable 41.

In order to manipulate the attaching device, it is sufficient to pull the lifting ring 44 with the aid of a long pole equipped with a hook. By pulling the ring 44, the manipulating arm 36 is actuated by means of the cable 41. The manipulating arm 36, which is integral with the manipulating ring 30, pivots the control shaft 17 inserted in the ring. The control shaft 17, in turn, transmits its movement to the hub 9 which causes the two arms 10 to disengage the gripping fingers 11 from the feet 13 of the fuel element 14.

To fit a damaged fuel element with its recovery shroud, it is necessary to use a basket 46 connected at its base to the frame 28 to serve as a support. The recovery shroud is introduced in the basket 46 while maintaining a certain orientation so that the hole 15 of the hub 9 is aligned with and receives the end 16 of the control shaft 17.

With the recovery shroud in place, it is sufficient to lower the damaged fuel element 14 into it and, toward the end of the path of the fuel element, to pull the control ring 44 in order to move the gripping fingers 11 to the disengaged position. When the fuel element 14 is resting on the base 2 of the recovery shroud, the control ring 44 is returned into its rest position, thereby effecting the insertion of the gripping fingers 11 into the two feet 13 of the fuel element 14.

In the principal intended application of the recovery shroud, it remains attached to the damaged fuel element 14, regardless of the manipulations performed subsequently. In this manner the risk of contaminating the pool is greatly reduced.

The foregoing description is set forth for the purpose of illustrating the present invention but is not intended to limit the scope thereof to any specific configuration. Clearly, numerous additions, reorientation of parts, or other modifications can be made by one of ordinary skill in the art without departing from the scope of the invention as set forth in the appended claims.

What is claimed is:

1. A recovery shroud for a damaged fuel element of a nuclear power facility, which fuel element includes at least one support foot, said shroud comprising:

a body surrounding at least a portion of said fuel element and having a base for receiving and supporting said at least one foot; and retaining means movable between a retaining position holding said at least one foot on said base, and a release position wherein said at least one foot is free to move from said base, said retaining means comprising at least one gripper finger mounted for movement toward and away from said at least one foot, said finger having a first end disposed adjacent said foot and a spring connected to bias said at least one finger toward said at least one foot;

actuation means for moving said finger toward and away from said foot, said actuation means comprising a rotatable element having a radially extending portion pivotally connected to a second end of said finger, said actuation means further comprising a shaft unattached to and contacting said rotatable element, and means for rotating said shaft; and guide means slidably connected to said finger to constrain said finger to move in an at least partially linear path along said guide means toward and away from said foot.

2. The combination as set forth in claim 1, wherein said actuation means further includes a frame having an upper portion removably supporting said base, and having a support structure supporting said shaft for rotation and such that said shaft is disposed in a substantially vertical orientation.

3. The combination as set forth in claim 1, wherein said rotatable element mounted to said base has a substantially vertical opening, and said shaft is a substantially vertical shaft having an upper end removably received in said vertical opening.

4. The combination as set forth in claim 3, and further wherein said actuation means comprises a lower portion having a rotatable element receiving the lower end of said vertical shaft, and means for rotating said lower portion rotatable element.

5. The combination as set forth in claim 4, wherein said means for rotating said lower portion rotatable element comprises a cable connected to said lower portion rotatable element and a grasping means connected to one end of said cable.

6. The combination as set forth in claim 1, wherein said base includes at least one drainage hole.

7. The combination as set forth in claim 1 wherein said guide means comprises an elongated opening in said finger and a pin fixed to said body and extending through said opening.

8. The combination as set forth in claim 1 wherein said finger is elongated and said linear path is longitudnal of said finger.

* * * * *